(12) United States Patent
Hurst et al.

(10) Patent No.: US 12,200,174 B2
(45) Date of Patent: Jan. 14, 2025

(54) TRADING CARD SORTER AND METHODS

(71) Applicant: LEXMARK INTERNATIONAL, INC., Lexington, KY (US)

(72) Inventors: Bradley Austin Hurst, Lexington, KY (US); Michael Charles Day, Lexington, KY (US); Daniel Lee Thomas, Lexington, KY (US); Michael Richard Turpyn, Nicholasville, KY (US); Casey Matthew Wesley, Lexington, KY (US); Darren Adam Keese, Lexington, KY (US); Jeremy Keith Payne, Georgetown, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 17/894,473

(22) Filed: Aug. 24, 2022

(65) Prior Publication Data

US 2022/0407972 A1    Dec. 22, 2022

Related U.S. Application Data

(63) Continuation of application No. 17/683,809, filed on Mar. 1, 2022, now abandoned.

(60) Provisional application No. 63/155,447, filed on Mar. 2, 2021.

(51) Int. Cl.
| H04N 1/00 | (2006.01) |
| B07C 5/342 | (2006.01) |
| B07C 5/36 | (2006.01) |

(52) U.S. Cl.
CPC ....... *H04N 1/00641* (2013.01); *B07C 5/3422* (2013.01); *B07C 5/361* (2013.01); *H04N 1/00572* (2013.01); *H04N 1/00602* (2013.01)

(58) Field of Classification Search
CPC ............ H04N 1/00641; H04N 1/00602; B07C 5/3422; B07C 5/361; B42F 17/343; G06T 7/0002
See application file for complete search history.

(56) References Cited

U.S. PATENT DOCUMENTS

2023/0222641 A1*  7/2023  Gordon ................. G06T 7/0002
                                                             209/577

* cited by examiner

*Primary Examiner* — Jacob S. Scott
*Assistant Examiner* — Miraj T. Patel

(57) ABSTRACT

A sorter processes trading cards in an affordable, accurate, and easy-to-use manner. The sorter includes an input and output bin. A transport path moves cards between the bins and has two scan bars, one above and one below the path. The scan bars capture an image of a top and bottom surface of ones of the cards. A controller coordinates movement of the cards along the path and receives the image for processing. Users interact with the controller by way of an interface to influence the processing. The sorter also includes a coil to detect metal foil on the cards. Other embodiments are envisioned.

20 Claims, 13 Drawing Sheets pHash: 1000000010111111001011111110111001111111010111011110011110111

TRADING CARD SORTER AND METHODS

This application claims priority as a continuation application of U.S. Ser. No. 17/683,809, filed Mar. 1, 2022, having the same title.

FIELD OF THE INVENTION

The present disclosure relates to methods and apparatus involving trading cards, such as gaming and collectible trading cards. It relates further to identifying, inventorying, sorting, and grading trading cards, to name a few. It also relates to providing individuals and retail establishments with an affordable, accurate, and easy-to-use portable device for managing their cards.

BACKGROUND

As trading card games have grown over the past twenty-five years, so too has the number of cards that players and retail stores find themselves managing. Often, both the players of these games, and the stores that buy, trade, and resell cards, find themselves inundated with managing thousands or in some cases millions of cards. Every year, too, the volume of cards grows as games involving the cards add new and varied cards to keep fresh the gameplay and entice more entrants and collectors into the market. In turn, a large secondary market exists for buying, trading, and selling individual cards. Knowing exactly which cards exist in inventory becomes profitable for individuals and can help during gameplay as having specific card combinations allow users to perform better. There exists, then, a need for players and stores that buy, sell, and trade these cards to efficiently inventory, sort, and manage large and varied card collections.

Currently, the marketplace has smart phone apps that utilize cameras of the phones to inventory cards one by one. In testing, the inventors found these apps slow as users must manually manipulate the cards one-by-one. The inventors also found these apps reliant on the camera quality of the phone, which varies dramatically from phone to phone, and background lighting sometimes makes for poor accuracy in identifying individual cards. The marketplace also has companies that sell hardware that identifies, inventories, and sorts cards. Two of the most prevalent hardware devices use camera-based detection, along with an armature and suction cup to sort the cards. The inventors, however, found the camera arrangements capable of only allowing viewing of cards but on a singular side of the card which forces users to presort by hand all cards into similar orientations, e.g., face-up. The inventors also found exorbitant prices for hardware ranging from many thousands of dollars to dozens of thousands of dollars. There exists, then, a further need for an affordable, accurate, and easy-to-use device to help individuals and stores to manage their trading card inventories.

Yet, any devices in the marketplace must further contemplate the careful handling of individual cards during sorting, as mishandled cards can become damaged and lose their valuation. As is known, the condition of trading cards is often assessed professionally, such as by the Professional Sports Authenticator (PSA). Current grading standards by the PSA range from 1 (Poor) to 10 (Gem Mint). A 10 (Gem Mint) rating card is described as "a virtually perfect card" that includes "four perfectly sharp corners, sharp focus and full original gloss." A 9 (Mint) rating card, on the other hand, is described as "a superb condition card that exhibits only one of the following minor flaws: a very slight wax stain on reverse, a minor printing imperfection or slightly off-white border." The difference of condition of but one point in the condition of a card can greatly affect its market value. For example, the card "Blue-Eyes White Dragon" from the 2002 Starter Deck Kaiba of the Yu-Gi-Oh! TCG has an estimated value of $80 for a 9 rating and $350 for a 10 rating (https://www.psacard.com/smrpriceguide/non-sports-tcg-card-values/2002-yu-gi-oh-starter-deck-kaiba/2885, 5/5/20). Therefore, even the slightest mishandling of a card during identifying and sorting can have a severe impact on card value and appeal. The inventors recognize a further need to avoid mishandling and damaging cards during processing.

SUMMARY

The foregoing and other problems are solved with a sorter that processes trading cards in an affordable, accurate, and easy-to-use manner. The sorter includes an input and output bin. A transport path moves cards between the bins and has two scan bars, one above and one below the path. The scan bars capture an image of a top and bottom surface of ones of the cards. A controller coordinates movement of the cards along the path and receives the image for processing. Users interact with the controller by way of an interface to influence the processing. The sorter also includes a coil to detect metal foil on the cards.

Other embodiments contemplate: a removable input tower to make it easy to swap new stacks of cards; feeding cards from a top of the stack using an elevating mechanism (could be spring loaded, or motor controlled); feeding cards from the bottom of the stack (the stack could be vertical or angled depending on the capacity necessary and the physical size requirements); and or feeding single or multiple stacks of cards.

For card picking, separating, and transporting cards, various embodiments envision: a pick roller mechanism for feeding cards from the top of a stack; one or more friction rollers for feeding cards from the bottom of a stack; a suction cup mechanism for lifting cards from the top of a stack; a mobile arm to move cards from one location to another; a transport belt to move cards during processing; pairs of nip rollers to move cards during transport; and or transporting cards via gravity on an angled surface.

Card imaging and recognition embodiments envision one or more of the following: a collimated laser or other sensor to measure the physical dimensions and shapes of cards; a smart phone interfacing with the sorter; a gloss sensor to detect glossy surfaces on cards; and or an inductive sensor to detect if cards have metal foil or not.

Card output and sorting embodiments include or not: single or multiple bins; output bins affixed to the sorter or removable; a dual-purpose bin acting as both an input and output bin; an output bin that doubles as a storage box for cards; sorting cards with a moving diverter; sorting cards with speed-adjusted rollers; sorting cards with a moving armature, including a single or multiple axis of movement; and or sorting cards with a moving and tiltable table.

Other embodiments are possible.

DETAILED DESCRIPTION

In the following detailed description, reference is made to the accompanying drawings wherein like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is only defined by the appended claims and their equivalents.

Figure 1:
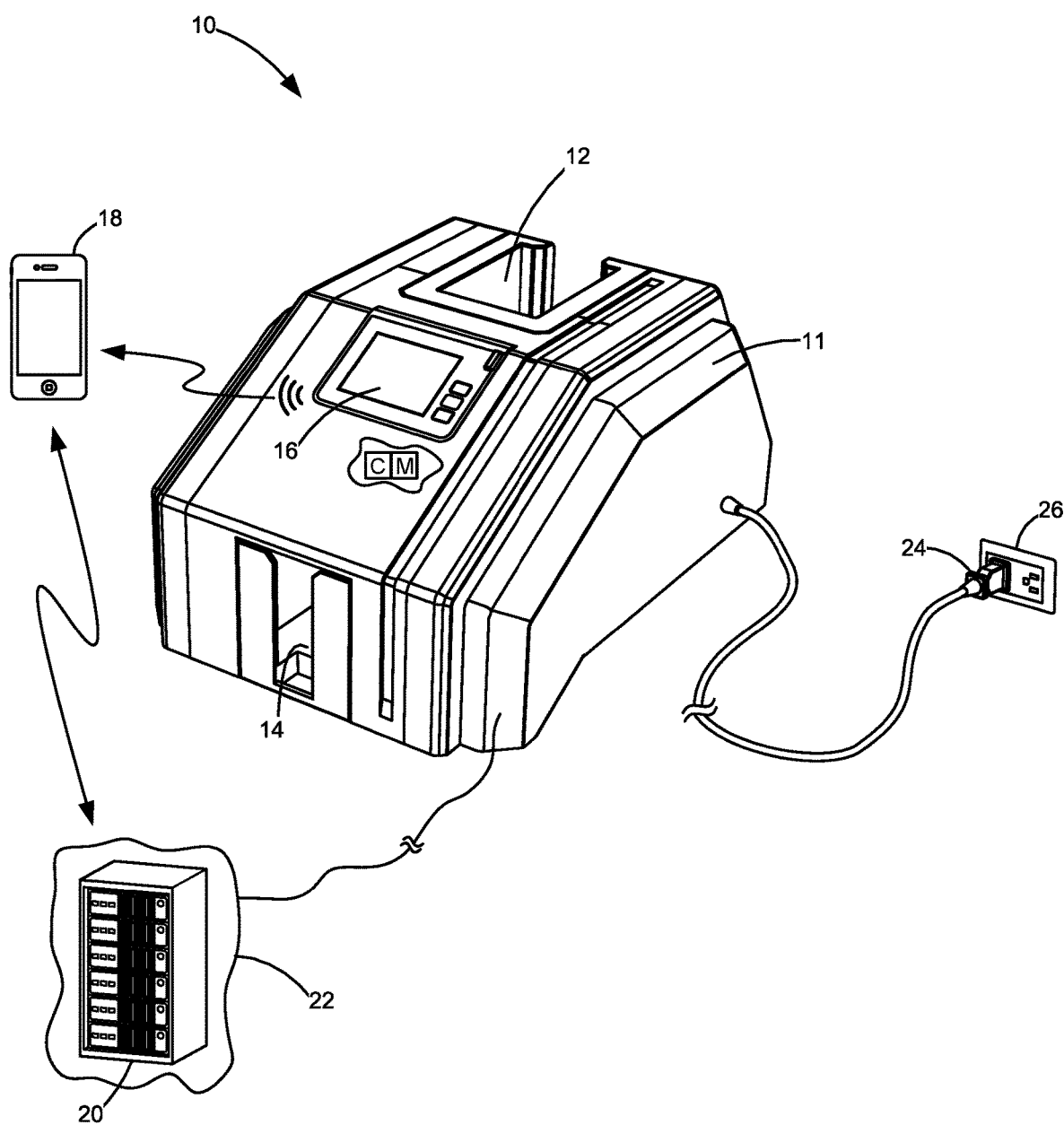
FIG. 1 is a diagrammatic view of a sorter for trading cards.

With reference to FIG. 1, a sorter 10 for trading cards includes a housing 11 that is portable for ease of placement by users. An input bin 12 receives the cards from the users and an output bin 14 is provided for depositing the cards after processing by a controller, C. The processing is any of a variety, such as identifying cards, grading cards, valuing cards, sorting cards by gameplay, random shuffling of cards, sorting cards by color, building decks of cards, arranging cards by face-up/-down orientation, or the like. The controller is also any of a variety, but typifies an ASIC(s), circuit(s), microprocessor(s), firmware, software, or the like. Users interact with the processing of cards by the controller via a user interface 16. By extension, the user interface may include computing connections, such as WiFi connection to a smart phone 18 and/or a wired, wireless connection to a computing network typified by a server 20 in a cloud environment 22 also accessible to the controller, C. A local or remote memory M further accompanies the controller in order to conduct processing. Similarly, a local or remote database is available to the controller, such as may be stored on the server, for accessing relevant information for processing. The controller and sorter 10 receive power by way of a traditional plug 24 connected to a power source 26.

Figure 2:
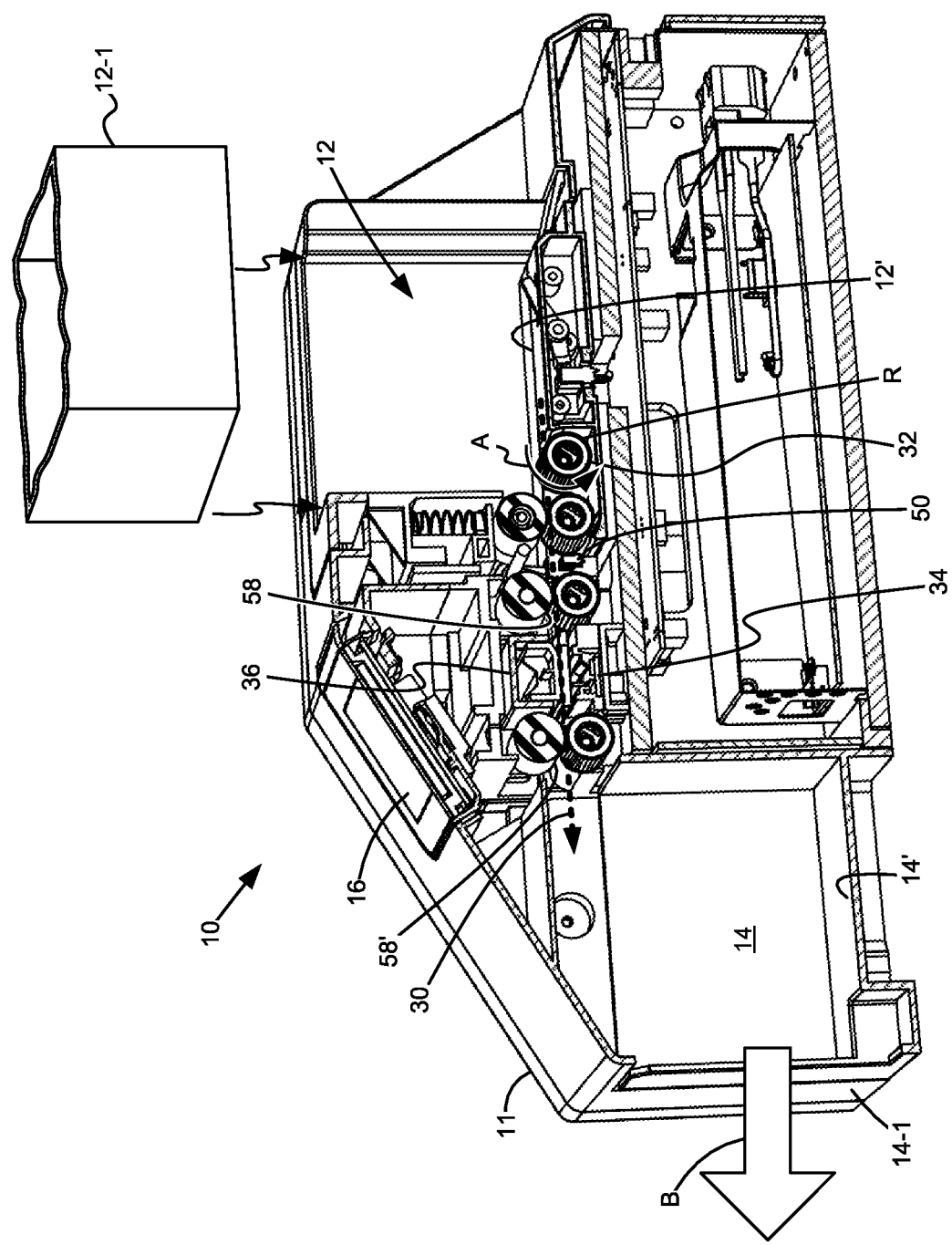
FIG. 2 is a cutaway view of a sorter for trading cards.
Figure 3:
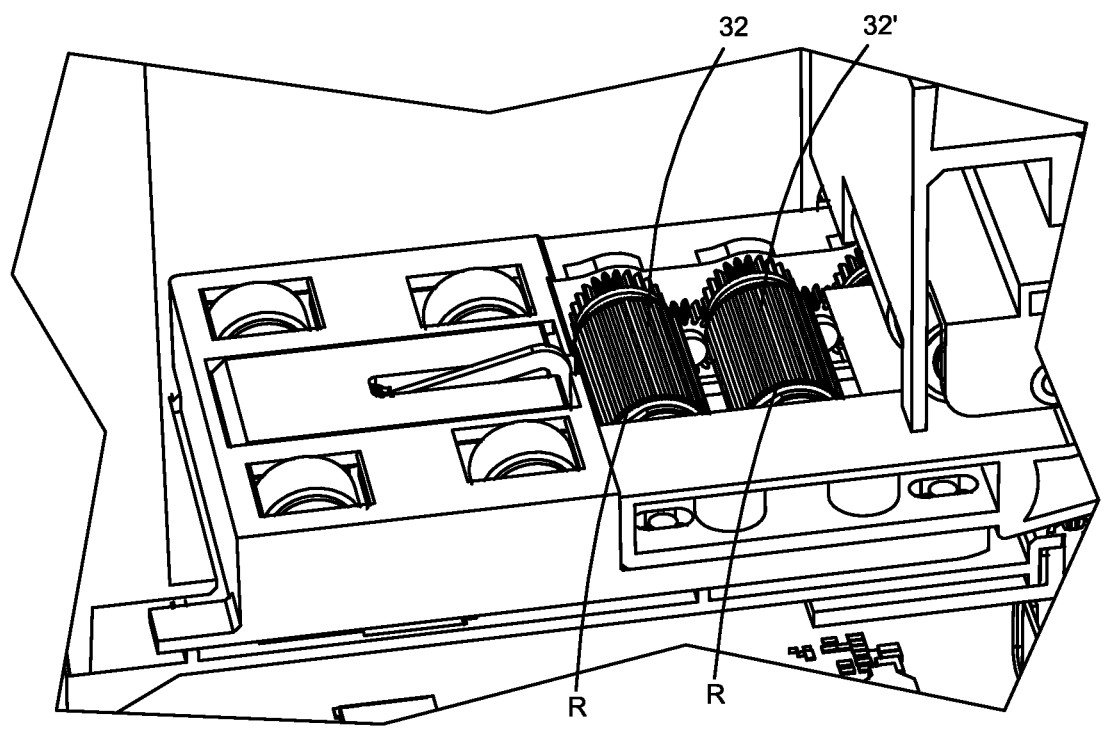
FIG. 3 is a diagrammatic view of rollers to pick trading cards from an input bin.

With reference to FIG. 2, a cutaway view of the sorter 10 reveals inner mechanical structures of the sorter. Among them, each of the input and output bins 12, 14 include a bottom 12', 14', to stack thereon the trading cards for processing. Ones of the cards travel from the bottom 12' of the input bin 12 to the output bin 14 along a transport path, given generally as dashed line 30. Along the path, a friction roller 32 rotates in the direction of arrow A to pick cards from the bottom of the input bin to start the travel of the cards from the input to the output bin. The roller 32 is preferably covered in rubber R to prevent damage to the trading cards as the roller rotates. The roller is also raised to prevent the cards from rubbing on stationary surfaces. The roller could be singular in design and/or exemplify a plurality of such rollers. (FIG. 3 depicts a simplified breakaway view of the sorter showing a plurality of friction rollers 32, 32' coated in rubber, R).

Figure 4:
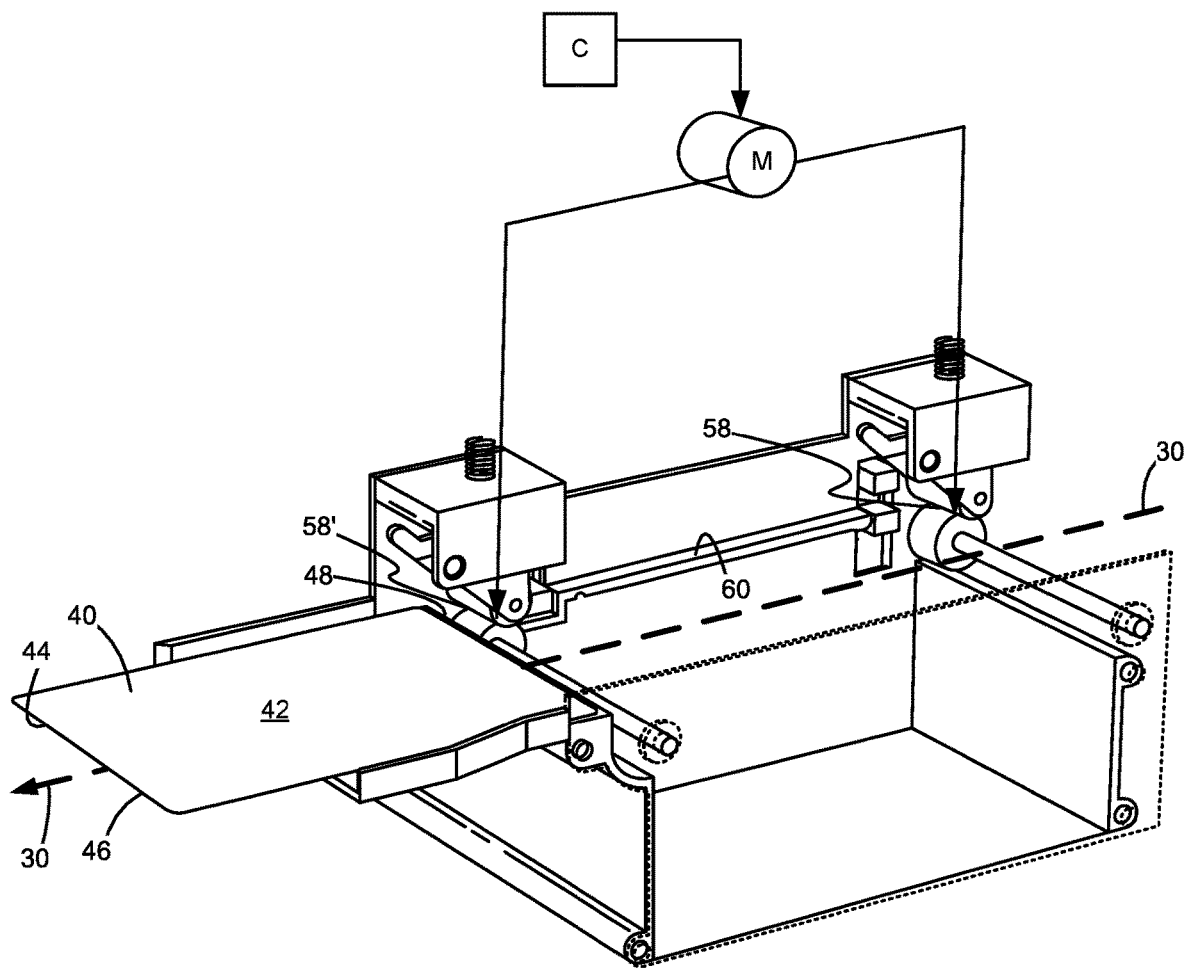
FIG. 4 is a partial diagrammatic view of a transport path for trading cards in a sorter, including a pair of roller nips.

Further along the path exists two scan bars 34, 36 with one 36 of the two scan bars above the transport path 30 and the other 34 of the two scan bars below the transport path. During use, the scan bars scan an image of a top surface 42 (FIG. 4, simplified transport path 30 depicted) and a bottom surface 44 (FIG. 4) of the ones of the trading cards 40 (FIG. 4) as the ones of the trading cards travel past the two scan bars along the transport path during use. The scanned image is provided to the controller C for processing. The scan bars extend widthwise over an entirety of the surfaces of the cards. That the two scan bars obtain dual-sided images of each card, the cards in the input bin can be oriented in either face-up/-down orientation without issue during processing. The controller also coordinates a timing of movement of the friction roller and initiation of the scanning by the scan bars. A sensor 50 facilitates this by optically sensing a leading edge 46 (FIG. 4) and/or a trailing edge 48 (FIG. 4) of the cards, which may be one and the same sensor, or separate from one another, to indicate to the controller to start/stop scanning by the scan bars.

A pair of roller nips 58, 58' on either side of the two scan bars 34, 36 along the transport path are provided for driving the trading cards along the transport path. As seen in the simplified view in FIG. 4, a single motor M rotates the pair of roller nips 58, 58' at a same speed coordinated by the controller C. In this way, the cards process without buckling or stretching. A rail 60 may also exist between the roller nips to keep at a same height along the transport path a leading edge of the trading cards and the roller nips to prevent damage to the cards during transit. In distance, the nips are spaced slightly farther apart than a length (l) of a standard trading card. The speed of the motor driven by the controller can be any of a variety, but one embodiment envisions driving the motor at a speed such that a card processing along the transport path 30 has enough momentum to move from the proximate nip to the distal nip without falling.

Figure 5:
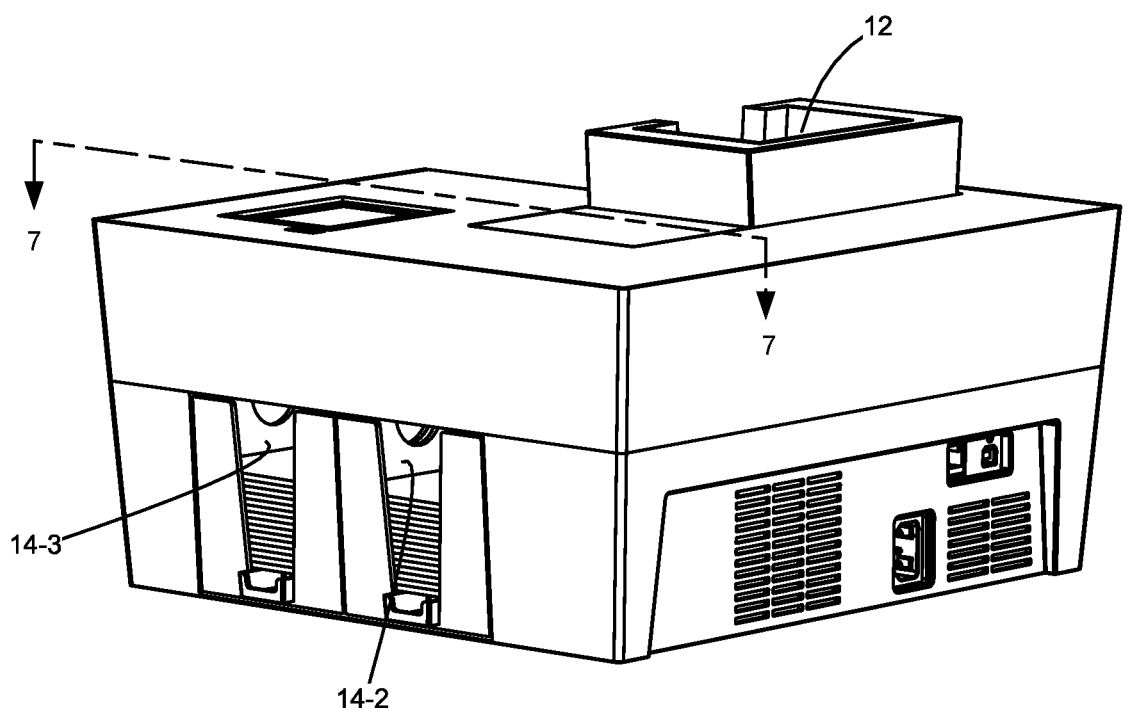
FIG. 5 is a partial view of a sorter having multiple output bins for trading cards.
Figure 6:
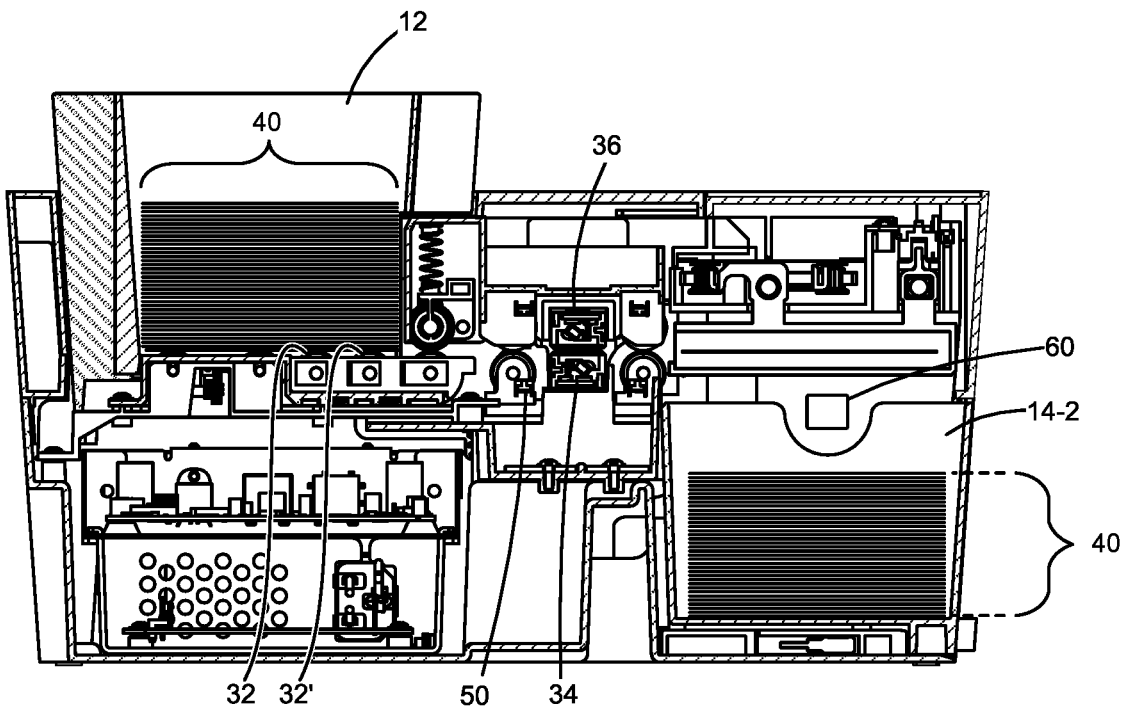
FIG. 6 is a cutaway view of a sorter for trading cards in an alternate embodiment.
Figure 7:
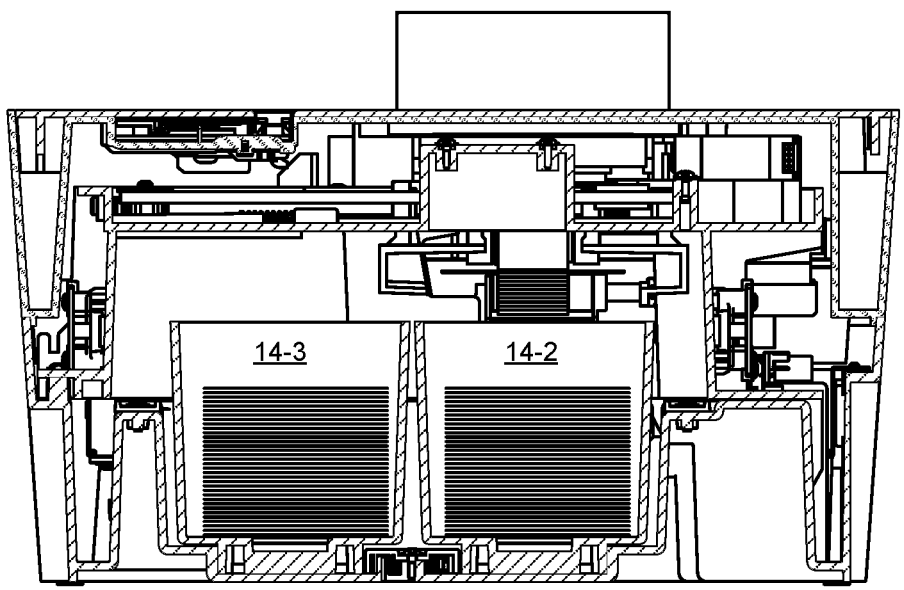
FIG. 7 is a cutaway view of a sorter having multiple output bins for trading cards.
Figure 8A:
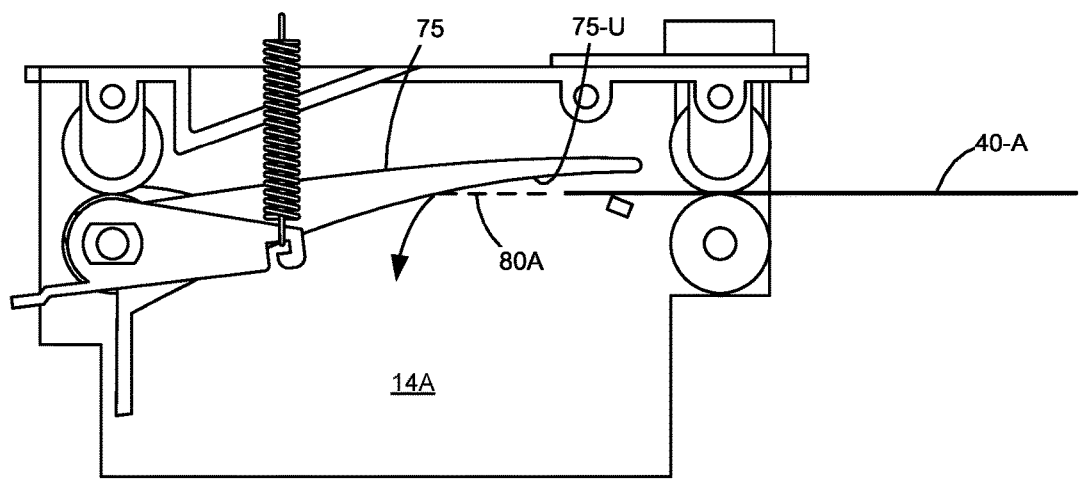
FIGS. 8A and 8B are partial views of a sorter having a diverter for directing trading cards to multiple output bins.
Figure 8B:
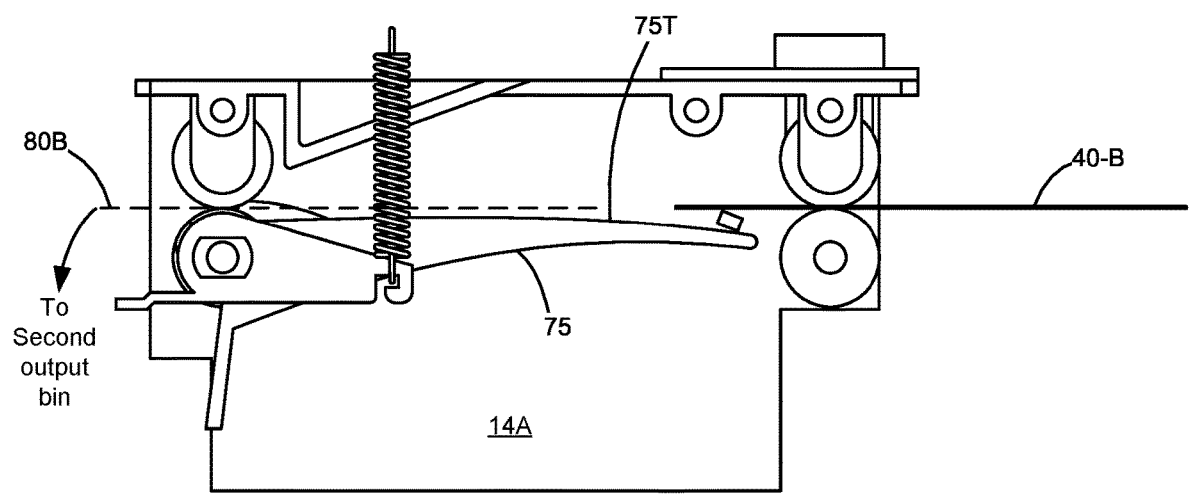

In various alternate embodiments, a removable tower 12-1 is envisioned in FIG. 2 for placement on the housing 11 for vertically holding additional trading cards for dropping into the input bin 12. The output bin may also include a removable chute 14-1 that moves in the direction of arrow B for access to the trading cards having been processed by the controller. With reference to FIG. 5, a sorter may have a plurality of output bins 14-2, 14-3 for trading cards sorted from a single input bin 12. In a front view of the sorter of FIG. 5, FIG. 6 shows the sorter in cutaway having two friction rollers 32, 32' for picking cards 40 from the input bin 12 for processing by the controller and, ultimately, for depositing in the output bin 14-2. The output bin may also have a non-contact, flush mounted optical sensor 60 for sensing a full condition of the cards 40 in the bin. FIG. 7 shows the two output bins 14-2, 14-3 in cross section of FIG. 5 along line 7-7. To sort the cards 40 into either of the output bins, a diverter 75 is given in FIGS. 8A and 8B. In FIG. 8A, the diverter 75 is positioned upward such that a processed trading card 40-A hits an underside 75-U along path 80A and falls into the output bin 14A. In FIG. 8B, the diverter 75 is positioned downward such that a processed card 40-B travels above the topside 75-T of the diverter along path 80B and bypasses output bin 14A and travels to a second output bin (not shown in this view).

Figure 9A:
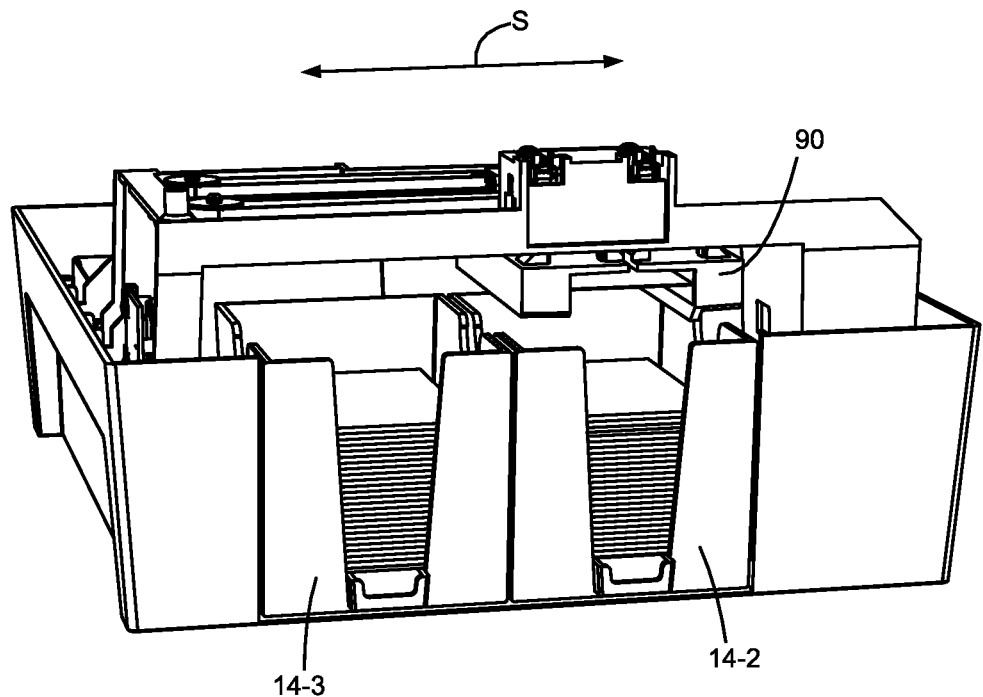
FIGS. 9A, 9B, 9C, and 9D are partial views of a sorter having an armature for directing trading cards to multiple output bins.
Figure 9B:
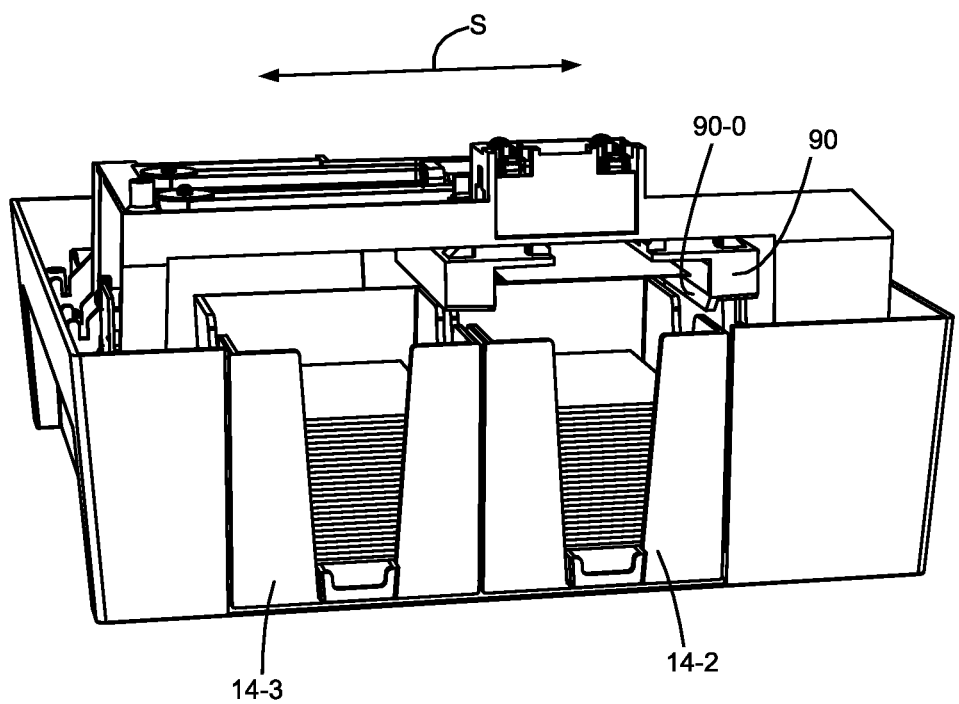
Figure 9C:
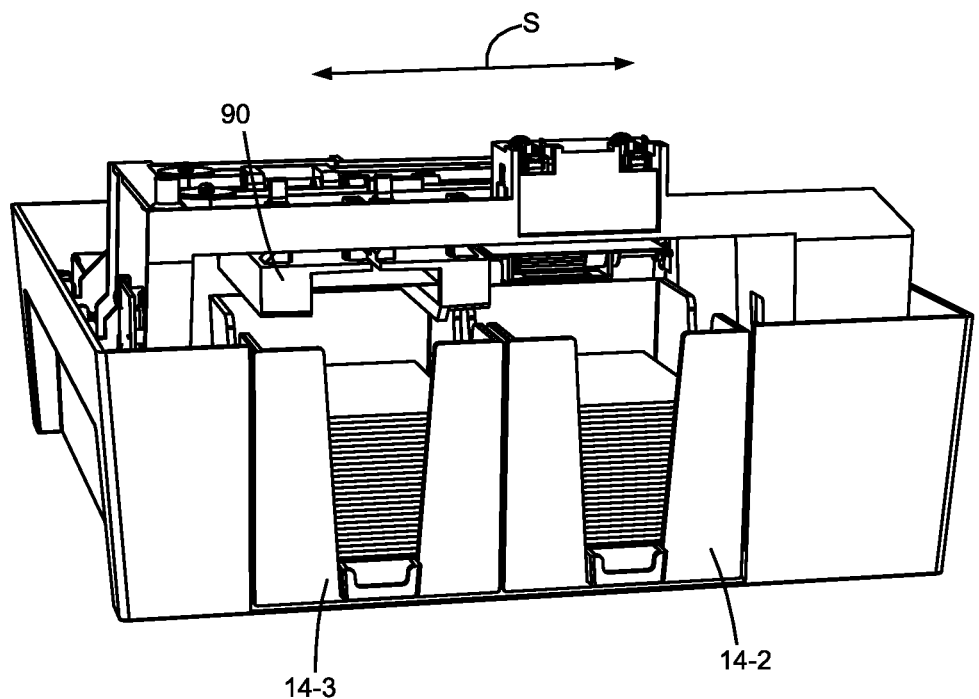
Figure 9D:
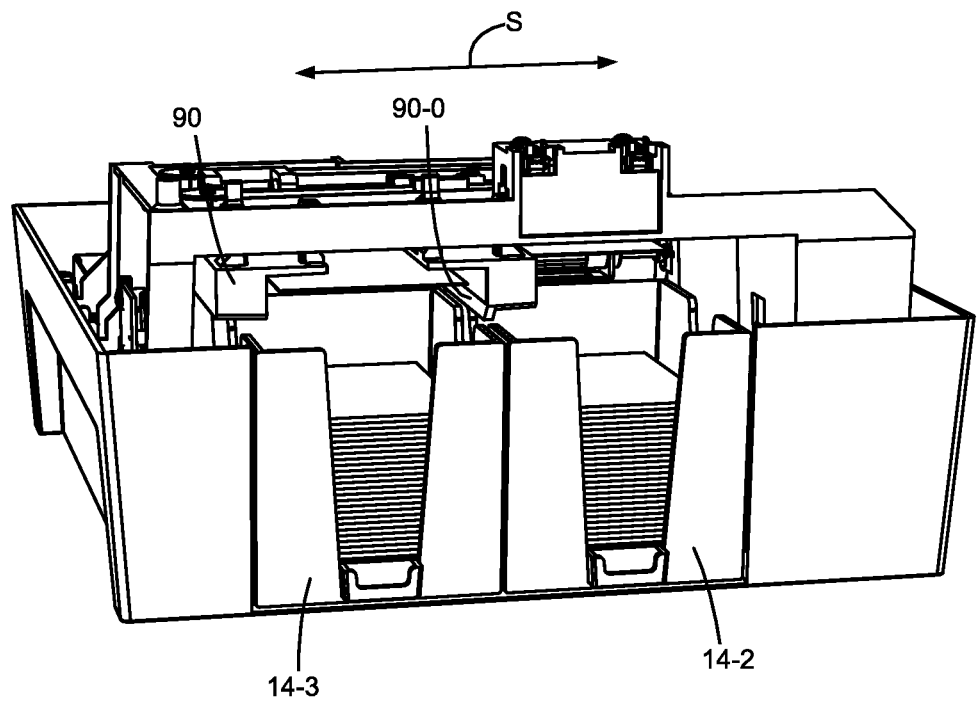

In lieu of a diverter, the sorter may include a shifting armature for depositing processed cards in the output bins. By comparing FIGS. 9A-9D, a shifting armature slides S back and forth above the output bins 14-2, 14-3. In FIG. 9A, the armature 90 slides above output bin 14-2 and a bottom 90-O opens in FIG. 9B so that a card processed by the controller can be dropped into output bin 14-2. Similarly, in FIG. 9C, the armature 90 slides above output bin 14-3 and the bottom 90-O opens in FIG. 9D so that a card processed by the controller can be deposited into the output bin 14-3.

Figure 10A:
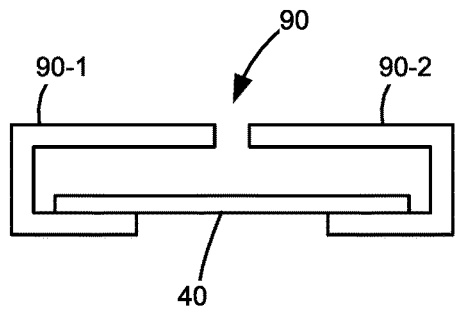
FIGS. 10A, 10B, 10C, and 10D are partial views of an armature for directing trading cards to multiple output bins.
Figure 10B:
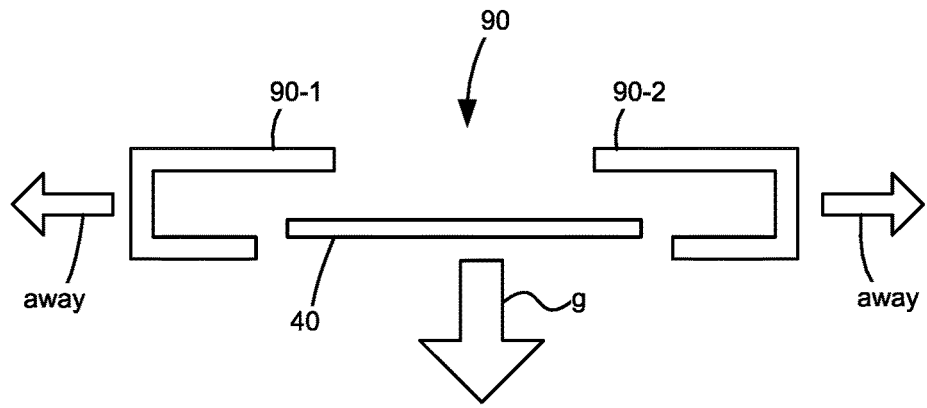
Figure 10C:
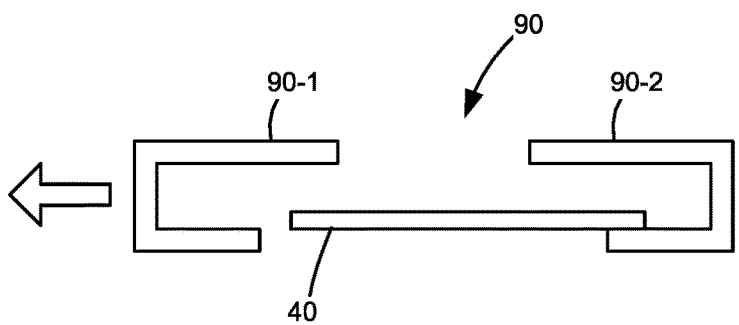
Figure 10D:
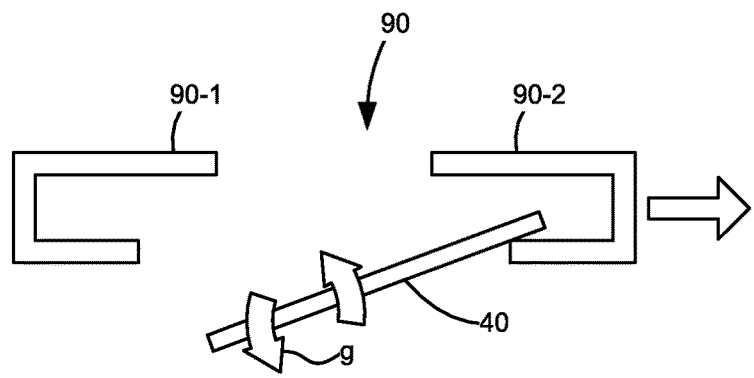

In the simplified views of FIGS. 10A-10D, the armature 90 (FIG. 10A) opens whereby two halves 90-1, 90-2 (FIG. 10B) simultaneously move away from the card 40 in the direction of the arrows and gravity, g, drops the card into an output bin. In FIG. 10C, the armature 90 can induce rotation into the card 40, such that if the sorter detects that a card is not facing the direction chosen by the user, the armature can be used to flip the card. By delaying movement of one of the halves of the armature, a rotation can be induced. In FIG. 10C, halve 90-1 moves away from the card 40 first, whereas halve 90-2 moves away from the card 40 second (FIG. 10D), thereby inducing a rotation in the card as seen by the arrows. The controller induces this behavior using a custom algorithm that, artisans will appreciate, is dependent on a stack height of the cards in a current output bin as well as the width of a given card to-be-rotated. Thus, the controller accounts for this by tracking how many cards have been deposited into each of the output bins and, by way of scanning of the cards with the dual can bars, knowing the size of the card.

Figure 11:
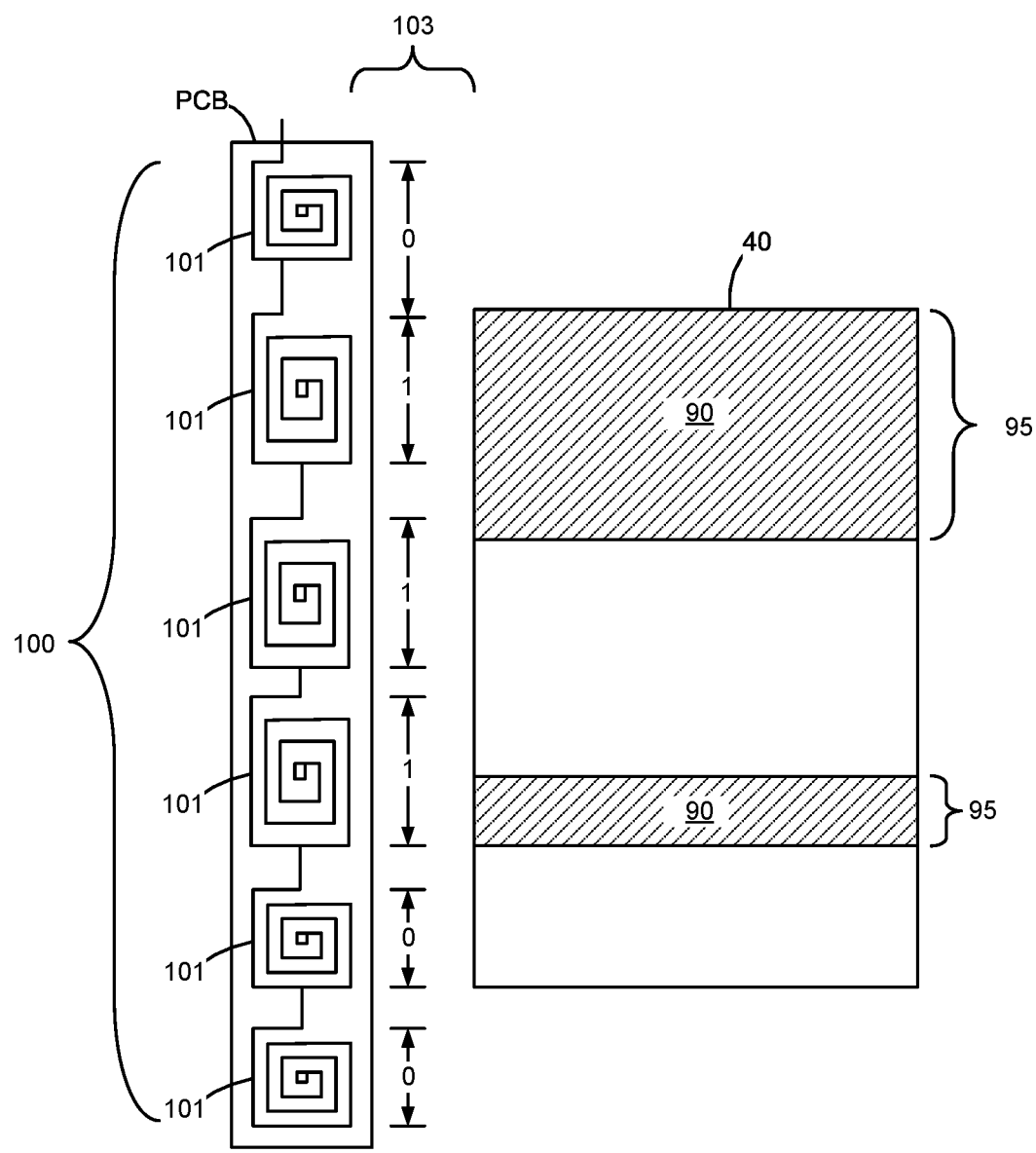
FIG. 11 is a diagrammatic view of a foil detection sensor for detecting in a sorter trading cards with metal foil.

With reference to FIG. 11, artisans will appreciate that many trading cards 40 have metal or foil 90 over an entirety of the card or in various sections 95 thereof, as shown. Thus, the sorter further includes a foil detection sensor 100 in the transport path as cards travel from the input to output bins. In one embodiment, the sensor has one or more planar coils 101 disposed on a printed circuit board (PCB) paired with a tuning capacitor (not shown). As is known, there exists a natural resonant frequency of the coils which is determined by the inductance of the coil (L), the tuning capacitance combined with the parasitic coil capacitance (C), and the resistance of the coil traces (R). During use, the tuned coil is connected to an off-the-shelf IC coordinated by the controller which both establishes a resonant excitation in the coil and measures the natural resonant frequency. The excitation produces an AC current in the coil which in turn creates an AC magnetic field. When a conductive object (in this case a foil 90 layer embedded in a trading card 40) is in the vicinity of the coil, the AC magnetic field creates an emf (electromotive force) which generates a current in the conductive object. From Faraday's Law, the current (referred to as an eddy current) creates a magnetic field, which tends to oppose the original magnetic field, and manifests itself as a decrease in the inductance of the tuned coil. Furthermore, any heating which may occur in the conductive object due to this eddy current manifests itself as an increase in the resistance R of the coil. Additionally, any capacity of the conductive object to store magnetic energy (its permeability) will manifest itself as an increase in the effective L of the coil. Due to the combination of these three effects, the resonant frequency of the tuned coil will shift. If the shift in resonant frequency is significant enough, the IC will toggle the state of a digital output. This indicates to the controller that a conductive object (the card having foil) is in the vicinity of the coil, thus detecting or not a card with foil. In a further embodiment, foil detection sensor 100 can be used to read binary information 103 of the card in the form of 1's and 0's by being placed adjacent to the card and the presence or not of metal on the card 40 indicates a binary 1 or 0, or vice versa. The form factor of the sensor, of course, can be modified to add or subtract a number of coils 101 allowing more or less data to be read over the surface of a card 40 according to sections 95 of foil. The binary information could be also used to authenticate trading cards.

While the sensor 100 can detect metal foil, the controller can additionally include optical character recognition (OCR) for regions of cards to further help with identification of the cards. That is, some cards include information on their surfaces indicating set names, card numbers within that set, and codes that determine the language of the card. While not all cards have this information, OCR will help provide information about the cards on those that do. In still other embodiments, a convolution neural network could be established for the controller and trained to detect all the various types of trading cards as users feed images of cards having been captured and labeled to build up a training set. In either, once a card has been recognized by the controller, that information is added to a database comprising the rest of the cards in a collection of cards held by the user.

Figure 12:
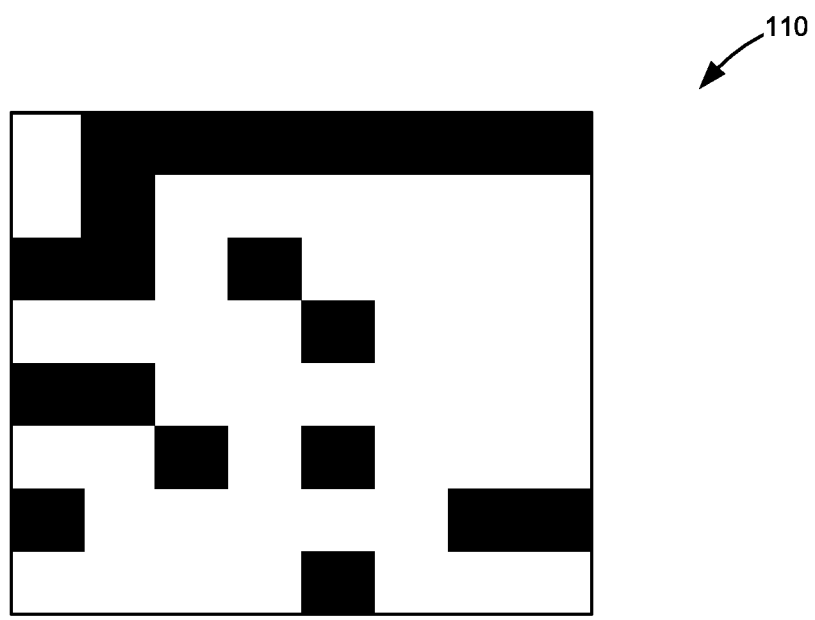
FIG. 12 is a diagram of representative pixels of a scanned image of a surface of a card and a hash therefor.

In any embodiment, the controller receives from the dual scan bars the scanned image of top and bottom surfaces of ones of the cards. According to a combination of edge detection, image rotation, and image cropping, each card processed by the controller is isolated from the background layer of the card. A hashing algorithm is then executed by the controller that generates a first set of hashes from each scanned image after cropping out the borders of cards and followed, next, by downscaling each scanned image (sans the border) to 32×32 pixels. In order to generate each hash, a discrete cosine transform is used $$X_k = \sum_{n=0}^{N-1} x_n \cos\left[\frac{\pi}{N}\left(n+\frac{1}{2}\right)k\right] k = 0, \ldots, N-1.$$

and applied to groupings of rows and columns of pixels of the scanned image. The hash occurs first in an upper left 8×8 grid of the pixels 110, as seen in FIG. 12, whereby a mean pixel value is calculated from the grid. In turn, a new binary map is generated by comparing each pixel value of the grid to the mean and assigning it a "1" if the pixel value is greater than the mean and a "0" otherwise. The hash continues in this fashion first from the upper left grid of pixels, then working across the 32×32 pixels and down to the bottom right, recording each 1 or 0 to generate a 64-bit perceptual hash representing the scanned image, e.g., pHash (FIG. 12). With few exceptions, cards within a trading card game all share a common backside which identifies the game to which they belong. As such, the pHash per card is then applied to reference images of the backsides of cards of each card game by XORing them, i.e., logically operating with exclusive or (XOR), to reveal a Hamming Distance. Those with the smallest Hamming Distance are then chosen as the best selection, or match of a scanned card (provided the distance meets a closeness threshold). The following is provided as an example, whereby the "Ferret Scan Hash" represents the pHash of bottom surface of a scanned card in the sorter and the Reference Hash represent the pHash of a "Magic the Gathering" card and the resulting Hamming Distance between the two is eight (8), thereby identifying the scanned card as a Magic the Gathering card.

```
Reference hash: 1000 1001 1010 1111 0001 1111 1111 0111 0011 1111 1001 0111 0111 1101 1111 1111
Ferret Scan hash: 1000 0000 1011 1111 0010 1111 1111 0111 0011 1111 1101 0111 0111 1100 1111 0111
   XOR: 0000 1001 0001 0000 0011 0000 0000 0000 0000 0000 0100 0000 0000 0001 0000 1000
      Hamming Distance = 8
```

It should be noted that a pHash is not rotation invariant, meaning that an inverted scanned image will generate a different hash value than a card having a different orientation. In turn, the controller compares scanned cards against not only backsides of trading card games, but also to those same backsides if inverted. Then, if an inverted back is matched, the correct orientation of the card can be determined regardless of which direction or side is facing up during processing. Regardless, once the backside of the scanned image of a card has been identified, the top surface of the corresponding image from the dual scan bars can be also perceptually hashed, e.g., pHash, to provide a perceptual hash for each of the top and bottom surface of the cards so scanned by the sorter.

The controller also generates a gradient hash (dHash). In one embodiment, this includes downscaling the scanned image of a surface of the card to an 8×8 grid of pixels. An 8×8 binary map is then created beginning with a second column of the pixels and setting each value to 1 if greater than its neighbor on the left or a 0 otherwise. From there, the gradient hash is generated in the same manner as the perceptual hash, e.g., beginning with the top left position of the pixels and working across and down to the bottom right, recording each 1 or 0 to generate a 64-bit dHash representing the scanned image. Comparisons of the dHash are then compared to gradient hashes of the reference images. Ultimately, matches are selected within a certain threshold of pHash values as compared against dHash values. This step is used because trading cards may share similar frequency information despite having different images. That the gradient hash dHash generated for a given scanned image is significantly different than the perceptual hash pHash for a given other-side surface of a card, this comparison increases the confidence that the closest match to both the perceptual and gradient hashes is the correct one.

Figure 13:
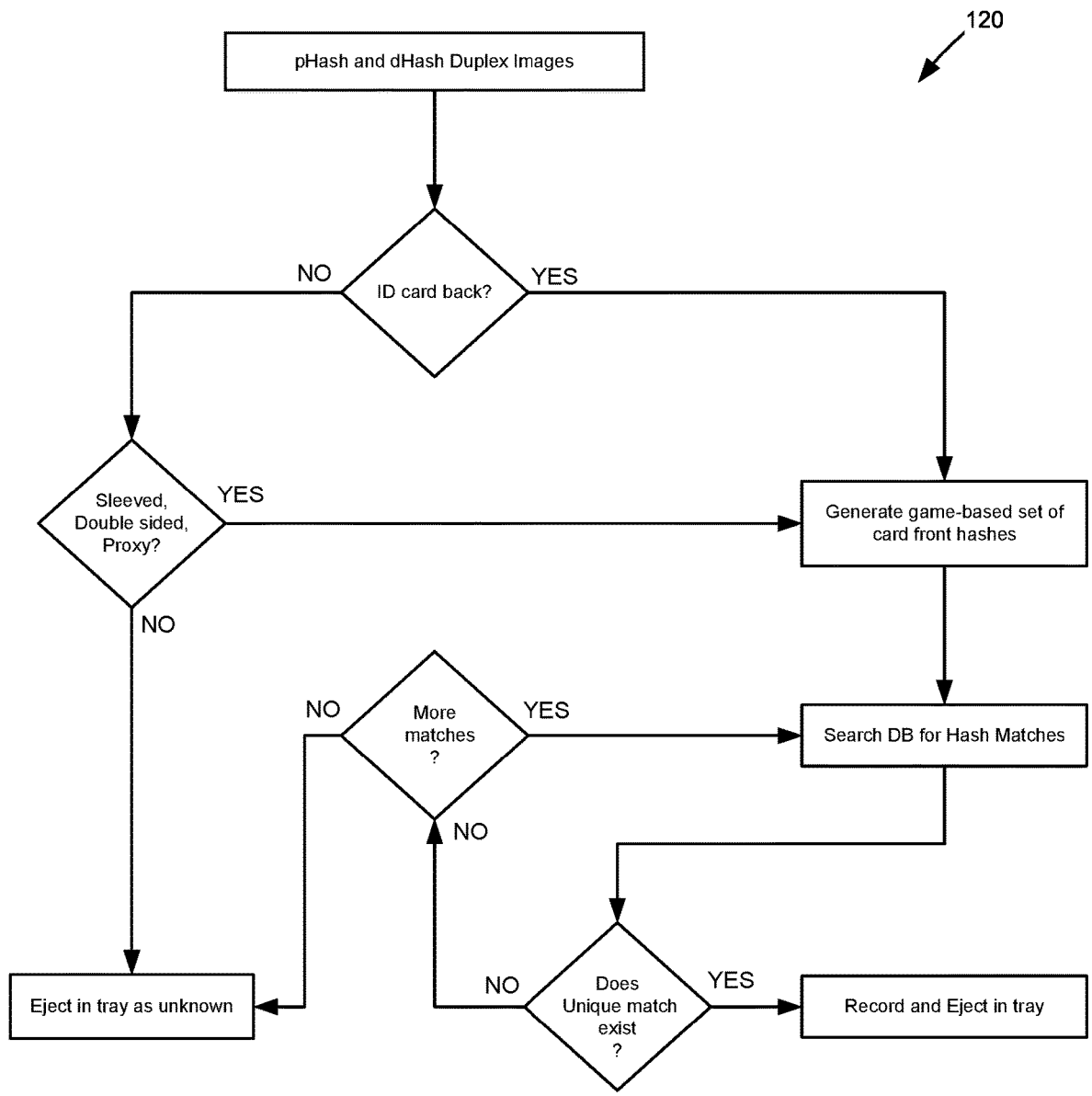
FIG. 13 is a flowchart for one embodiment of matching scanned images of cards versus scanned images of reference cards, and sorting thereby.

As several trading card games include different cards with similar artwork, and reprinted cards in different editions have only slight differences from one another, a high degree of confidence in matching scanned cards to reference cards is obtained if the controller obtains multiple matches for its scanned cards in relation to the reference cards. Thus, the flowchart 120 of FIG. 13 shows but one technique the controller executes per the perceptual and gradient hashes obtained from the tops and bottom surfaces of the scanned cards relative to the database (DB) of reference cards.

The foregoing illustrates various aspects of the present disclosure. It is not intended to be exhaustive. Rather, it is chosen to describe the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A method for sorting trading cards having a border, comprising:
   imaging with two scan bars in a card sorter along a transport path from an input to an output bin top and bottom surfaces of a plurality of trading cards in the card sorter to receive scanned images of pixels therefor;
   cropping out the pixels of the scanned images corresponding to the border thereby leaving rows and columns of pixels corresponding to ones of the pluralities of trading cards;
   hashing the rows and columns of pixels corresponding to said ones of the pluralities of trading cards;
   comparing the hashing to pluralities of reference hashes stored in a local or remote database available to a controller of the card sorter; and
   based on a hamming distance between the hashing and the reference hashes, providing results of various criteria regarding the ones of the pluralities of trading cards.

2. The method of claim 1, further including providing a user interface for the card sorter, the results being provided on the user interface.

3. The method of claim 1, wherein the hamming distance results by XORing the hashing and the reference hashes.

4. The method of claim 1, wherein the comparing further includes comparing if said ones of the pluralities of trading cards are inverted.

5. The method of claim 1, further including downscaling the rows and columns of the pixels corresponding to said ones of the pluralities of trading cards.

6. The method of claim 1, further including generating a second hashing for comparison to further pluralities of hashes of said pluralities of reference hashes stored in the local or remote database.

7. The method of claim 1, further including hashing with a discrete cosine transform.

8. The method of claim 1, further including establishing a computing connection between the controller and a smart phone, including providing the results to the smart phone.

9. The method of claim 1, further including hashing in groupings of 8×8 grids of the pixels.

10. The method of claim 1, further including determining a quality grade of each of the ones of the plurality of trading cards based.

11. The method of claim 1, further including establishing a computing connection between the controller and a server for said comparing.

12. The method of claim 1, further including providing a second output bin and depositing the plurality of trading cards into one of the output bin and the second output bin of the card sorter.

13. The method of claim 1, further including imaging with the two scan bars from above and below the plurality of trading cards.

14. The method of claim 1, further including determining whether any of the plurality of trading cards include metal foil.

15. The method of claim 1, further including determining whether any of the pluralities of trading cards include a glossy surface.

16. A method for sorting trading cards in a card sorter, comprising:
- providing a user interface for a card sorter having a transport path from an input to an output bin;
- imaging with two scan bars tops and bottom surfaces of a plurality of trading cards in the card sorter processed along the transport path to receive scanned images of pixels therefor;
- comparing the pixels to pluralities of reference pixel values stored in a local or remote database available to a controller of the card sorter; and
- providing results of the comparing on the user interface.

17. The method of claim 16, further including establishing a computing connection between the controller and a smart phone, the results being provided to the smart phone.

18. The method of claim 16, wherein the comparing further includes executing hashes of the pixels and the reference pixel values.

19. The method of claim 18, further including removing background pixels of the pluralities of the trading cards before the executing hashes.

20. The method of claim 16, further including executing optical character recognition on the tops and bottom surfaces of the pluralities of trading cards.

* * * * *